C. W. EISENMANN.
MAGNETIC COMPASS.
APPLICATION FILED AUG. 19, 1919.

1,435,633.

Patented Nov. 14, 1922.
2 SHEETS—SHEET 1.

Inventor:—
Carl W. Eisenmann
by his Attorneys.—
Howson & Howson

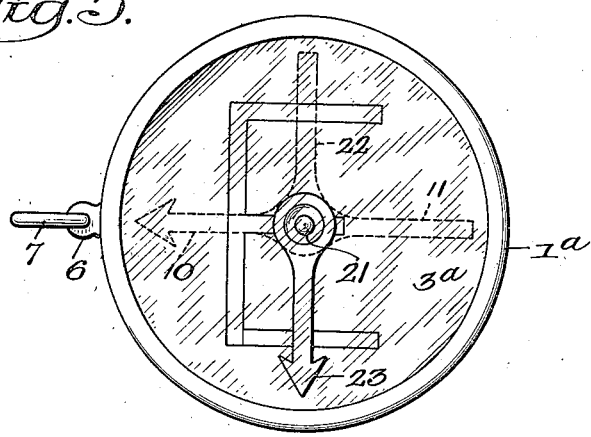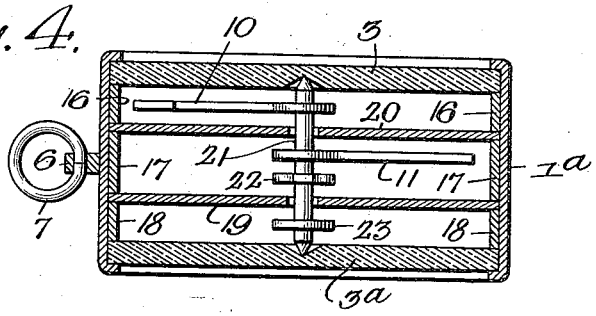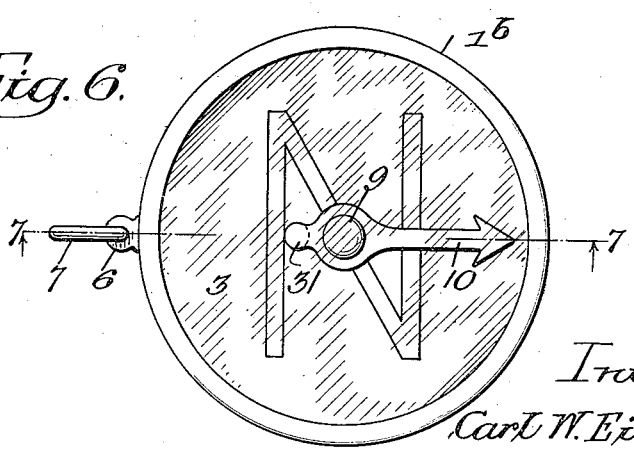

Patented Nov. 14, 1922.

1,435,633

UNITED STATES PATENT OFFICE.

CARL W. EISENMANN, OF NEBRASKA CITY, NEBRASKA.

MAGNETIC COMPASS.

Application filed August 19, 1919. Serial No. 318,530.

*To all whom it may concern:*

Be it known that I, CARL W. EISENMANN, a citizen of the United States, residing in Nebraska City, Nebraska, have invented Magnetic Compasses, of which the following is a specification.

One object of this invention is to so dispose the movable or magnetic element of a compass that it shall be possible to distinguish the position of the needle and more especially its north end in a poor light or when the compass is at a distance as well as when it is viewed at a relatively sharp angle as is sometimes necessary when the device is used in making electrical tests.

It is further desired to provide a magnetic compass in which the parts are so arranged as to permit the position of the needle to be easily and quickly determined even though it is oscillating as when first subjected to a strong magnetic field or when the compass as a whole is moving as is the case when it is mounted upon a motor vehicle or used in air craft.

These objects and other advantageous ends I attain as hereinafter set forth, reference being had to the accompanying drawings, in which, Fig. 1 is a plan of a compass constructed in accordance with my invention;

Fig. 4 is a transverse vertical section, illustrating a double faced compass involving my invention;

Fig. 5 is a plan of the second face of the compass shown in Fig. 4, its first face having the same appearance as that of the compass shown in Fig. 1;

Fig. 6 is a plan of another modification of the invention; and

Figure 1:
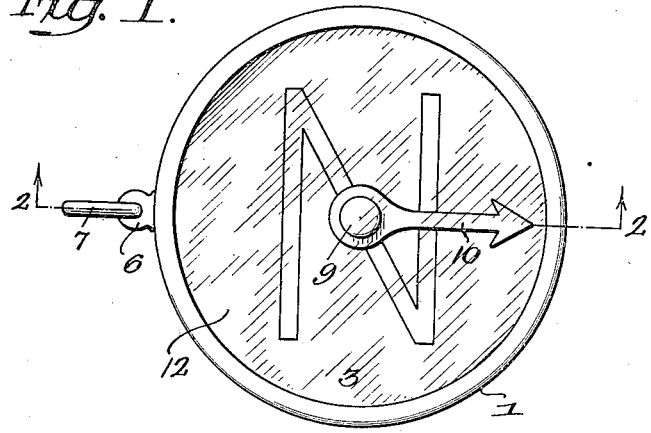

In the above drawings 1 represents a flat cylindrical casing closed at one end by an integral bottom 2 and at the opposite end with a glass cover 3. The latter rests upon the upper of two spacing rings 4 and 5 held in place by the inwardly flanged top edge of the casing 1, which is provided with an eye 6 and a ring 7 engaging the same whereby the compass may be attached to a chain or conveniently held. A staff or pivot pin 8 projects axially in the casing from the bottom 2 thereof to which it is rigidly fixed and a cup bearing 9 is rotatably mounted between the free pointed end of this pivot and the under side of the glass cover.

In accordance with one form of my invention, the magnetic element or needle of the compass is divided into two sections 10 and 11 rigidly fixed to the bearing 9 so as to project in opposite directions therefrom but laterally displaced so that the north end 10 of said needle swings immediately under and adjacent the glass cover 3 while the south end 11 which balances it, swings in a plane adjacent or below the central plane of the casing. The amount of the displacement of the two parts of the magnet or needle 10 and 11 or their arrangement is such as to permit of the extension between them of a diaphragm or partition 12 whereby the south end of said needle is concealed from observation.

In the case illustrated said diaphragm extends completely across the casing so as to divide it into two chambers, in the upper of which the north end 10 of the needle operates while in the lower chamber is the south end 11. The upper or exposed face of the diaphragm 12 which is visible through the glass covering is preferably marked with a large and easily distinguishable "N" as indicated in Fig. 1 so that it is a simple matter to distinguish the position of the north end of the needle even though it be in violent oscillation and viewed at an acute angle to its plane of movement.

Figure 2:
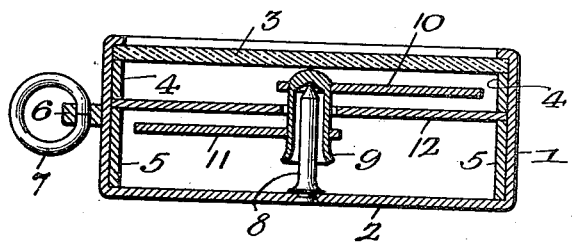
Fig. 2 is a transverse vertical section on the line 2—2, Fig. 1.
Figure 3:
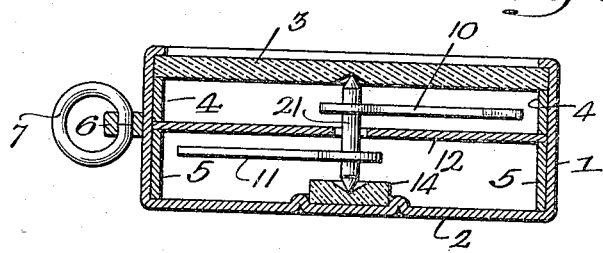
Fig. 3 is a vertical section similar to Fig. 2, illustrating a slightly modified form of the invention.

In that form of the invention shown in Fig. 3 the diaphragm, as in the case of Figs. 1 and 2, is held in position between the two spacing rings 4 and 5 so as to conceal the south end of the needle and serve as a dial for the north end thereof, although in this case the two parts 10 and 11 of the needle are rigidly fixed to a staff or spindle 13 so as to project in opposite directions therefrom and said staff has its ends formed to rotate in a suitable depression or cavity in the center of the glass cover 3 and in a hardened bearing 14 mounted at center of the bottom 2 of said casing respectively.

In that form of my invention shown in Figs. 4 and 5 I have provided a cylindrical metal casing 1$^a$ having both of its ends inwardly flanged and respectively closed by two glass or other transparent covers 3 and 3$^a$. Between these covers and holding them in place in the casing, are three spacing rings 16, 17 and 18 which also serve to position between them a pair of parallel diaphragms 19 and 20 which cooperate with each other and with the two covers 3 and 3$^a$ to form three chambers in the casing. A rotary staff or spindle 21 has its properly formed ends operative in cavities in the centers of the two glass covers 3 and 3$^a$ and has rigidly fixed to it a two-part magnet needle 10—11 of which the north section 10 is visible through the cover 3 against the back ground provided by the diaphragm 20. The south end of this needle as before balances and projects oppositely from the north end 10 and is concealed in the intermediate chamber between the two diaphragms 19 and 20.

Also fixed to the staff 21 are two half needle sections 22 and 23 of non-magnetic material projecting in opposite directions therefrom and laterally displaced so that the first of them is operative within the intermediate chamber containing the south end of the magnetic needle while the second section 23, which is balanced by the half needle section 22, is operative in the chamber defined by the second glass cover 3$^a$ and the diaphragm 19 so that it is visible through said cover. This second diaphragm is preferably marked with a large letter "E" as indicated in Fig. 5 and it is to be noted that the two half needle sections 22 and 23 project from the staff in lines at right angles to the lines of the two-part magnet needle 10—11. As a consequence when the visible end 10 of the magnetic needle points to the north, the visible end 23 of the non-magnetic needle points east so that with this form of the invention it is much more convenient to locate the east and west directions than with a compass pointing north and south only.

Figure 7:
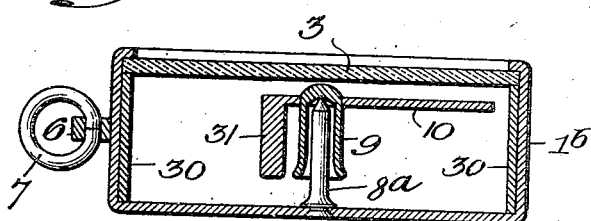
Fig. 7 is a transverse vertical section on the line 7—7, Fig. 6.

If it be desired to reduce the axial length of the compass and simplify its construction, this may be done in the manner indicated in Figs. 6 and 7 by making its casing 1$^b$ relatively flat and mounting in it a single spacing ring 30 between the upper end of which and the inwardly flanged edge of the casing the glass cover 3 is mounted. As in that form of the invention shown in Fig. 1, the pivot pin 8$^a$ is fixed to and projects from the center of the casing bottom 2 and carries a cup bearing 9. In this instance however while the north end 10 of the magnetic needle which projects from this cup bearing has a length but little less than the radius of the casing, its south end is made in the form of a relatively short counter weight 31 projecting from said bearing in a line opposite that of the needle end 10 but so made as to be comparatively inconspicuous. In this case the inner face of the bottom of the casing would be marked with a large "N" as indicated in Fig. 6 but, owing to its small size and the fact that it is preferably extended parallel with the pivot pin, the south end 31 is hardly noticeable, while as before the north end may be easily and quickly observed and its position noted.

From the above description it will be seen that a compass constructed in accordance with my invention is particularly available for quickly indicating the directions even when the light is poor and the conditions are such as would render an ordinary compass practically useless or at best difficult to utilize for quick or angular observations.

I claim:

1. The combination in a magnetic compass of a casing; a magnetic needle rotatably mounted therein and made in two axially displaced parts; with means for concealing one of said parts.

2. The combination in a magnetic compass of a casing; a magnetic needle rotatably mounted therein and made in two axially displaced parts; with means for concealing one of said parts consisting of a diaphragm mounted in the casing between the planes of movement of said needle parts.

3. The combination in a magnetic compass of a casing; a magnetic needle rotatably mounted therein; and a non-magnetic indicator movable with and projecting at right angles to the line of the needle; with means for concealing one half of each needle while permitting the remaining halves to remain visible.

4. The combination in a magnetic compass of a casing having transparent covers at its opposite ends; a magnet rotatably mounted in the casing and visible through one of the covers; with a non-magnetic indicator connected to and movable with the magnet and visible through the second cover.

5. The combination in a magnetic compass of a casing having transparent covers at its opposite ends; a magnet rotatably mounted in the casing and having a portion visible through one of the covers; a non-magnetic indicator connected to and movable with the magnet and visible through the second cover; with means for concealing one pole of the magnet.

6. The combination in a magnetic compass of a supporting structure; and a magnet rotatably mounted in said structure, having but a single indicating arm projecting on but one side of its axis of rotation and visible on one face of said structure; with a dial constituting a background for said indicating arm and having on it a letter indicative of the direction towards which the arm points.

7. The combination in a magnetic compass of a supporting structure; and a magnet rotatably mounted in said structure, having but a single indicating arm projecting on but one side of its axis of rotation and visible on one face of said structure; with a diaphragm concealing a portion of said magnet and having on it a letter indicative of the direction toward which the arm points.

In witness whereof I affix my signature.

CARL W. EISENMANN.